United States Patent

[11] 3,629,030

| [72] | Inventor | Alvin G. Ash<br>P.O. Box 5893, Gig Harbor, Wash. 98335 |
| --- | --- | --- |
| [21] | Appl. No. | 736,331 |
| [22] | Filed | June 12, 1968 |
| [45] | Patented | Dec. 21, 1971 |

[54] METHOD FOR FORMING A MANDREL AND FABRICATING A DUCT THEREABOUT
3 Claims, 9 Drawing Figs.

[52] U.S. Cl................................................. 156/189,
18/DIG. 19, 156/184, 249/65, 264/94, 249/183, 264/226, 264/314, 264/335
[51] Int. Cl......................................................... B29c 1/02,
B29c 1/12, B65h 81/06
[50] Field of Search............................................ 264/88, 94, 220, 225, 226, 227, 314, 335, 271, 279; 18/DIG. 14; 249/61, 183; 156/189

[56] References Cited
UNITED STATES PATENTS

| 2,289,990 | 7/1942 | Parker.......................... | 264/314 |
| 2,739,350 | 3/1956 | Lampman .................... | 18/DIG. 44 |

*Primary Examiner*—Robert F. White
*Assistant Examiner*—J. H. Silbaugh
*Attorney*—Seed, Berry & Dowrey ABSTRACT: A method of forming a plastic duct of irregular configuration employing an elastic mandrel that is used repeatedly in the manufacture of a plurality of similarly shaped ducts. The mandrel is contracted for separating it from a finished duct and is expanded for fabricating a subsequent duct. The mandrel is formed by placing an inflatable tube or plurality of tubes in a mold with a quantity of uncured elastic material, inflating the tube or tubes, and curing the elastic material to form the composite inflatable mandrel. The tube or tubes have a limited expanded cross section and the mandrel can be inflated to the same size and shape at any time by fully inflating the tube or tubes.

PATENTED DEC 21 1971 3,629,030
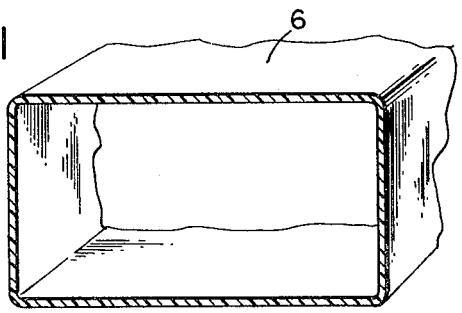
FIG_1
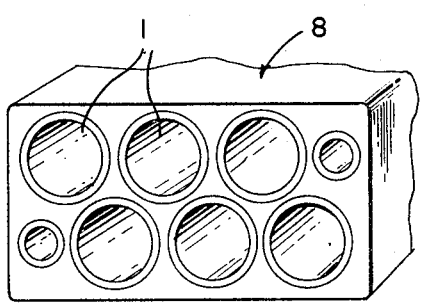
FIG_4
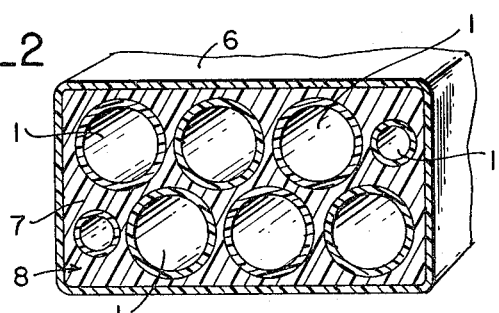
FIG_2
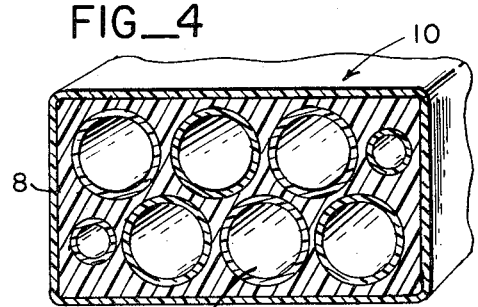
FIG_5
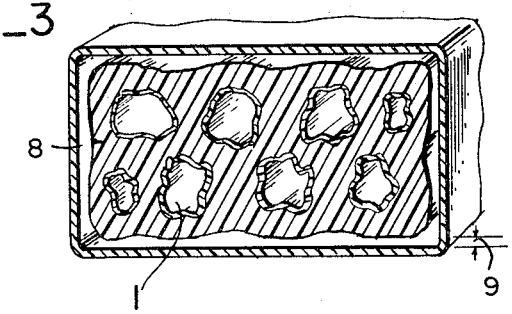
FIG_3
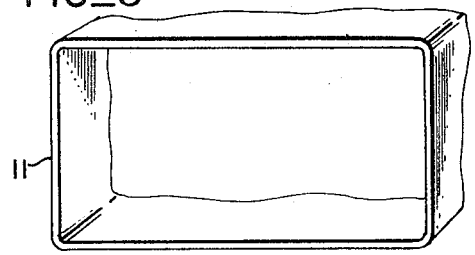
FIG_6
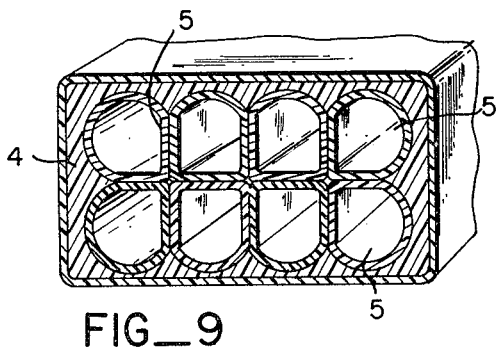
FIG_9
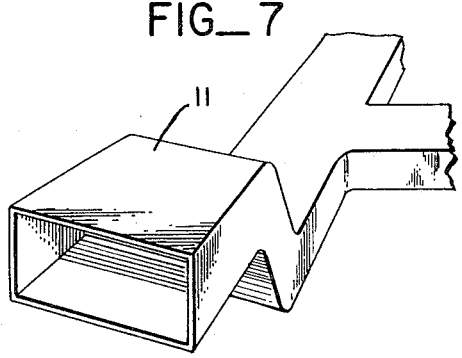
FIG_7
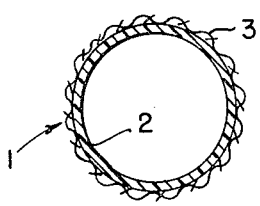
FIG_8
ALVIN G. ASH
*INVENTOR.*
BY Seed, Berry & Dowrey
*ATTORNEYS*

METHOD FOR FORMING A MANDREL AND FABRICATING A DUCT THEREABOUT

BACKGROUND OF THE INVENTION

This invention relates generally to methods for forming elongated, irregularly shaped hollow articles, commonly referred to as "ducts." More specifically, the invention relates to the method for forming a reusable mandrel and the method of producing products formed on the mandrel.

Aircraft industries and others manufacture and use considerable quantities of elongated, hollow articles for piping in air conditioning and heating systems, and for enclosures for electrical wiring, control cables and the like. The ducts in many instances are fabricated from fiber-reinforced thermosetting resins or plastics. A generally used process for manufacturing the plastic ducts is to construct a master female mold. The mold is filled with a material such as plaster-of-paris and allowed to set. Thereafter, the female mold is split and the plaster-of-paris mandrel is removed. The mandrel is oven dried and coated with a parting compound or agent. Sheets of uncured, resin-impregnated fiber glass are wrapped around the mandrel and the assembly is cured in an oven. After the resin is cured, the plaster-of-paris mandrel is separated from the completed duct by hammering on the outside of the duct with a rubber mallet.

The foregoing method is time consuming and costly. One drawback with the method is the difficulty of separating the mandrel from the finished product. The major disadvantage, however, is that the mandrel is not reusable thereby making it undesirable where production of a plurality of similar articles is required.

It is accordingly an object of the present invention to improve the methods for manufacturing such hollow articles. It is an object to form a mandrel used repeatedly in the manufacture of like articles. A further object is to provide a reusable mandrel which can be expanded and contracted. A still further object is to fabricate a mandrel from an elastic material having a collapsible chamber formed therein. The elastic material contracts under atmospheric pressure upon establishing a vacuum in the chamber. It is specifically an object of the present invention to provide an improved process for production of ducts having complicated configurations.

DESCRIPTION OF THE DRAWINGS

Other objects and features of the present invention are apparent from the description of the invention and the drawings which are:

FIG. 1 is a partial perspective cross-sectional view of a master female mold of a hollow article to be manufactured;

FIG. 2 is a partial perspective cross-sectional view of the female mold in FIG. 1 having mandrel forming tubes and an elastomeric material disposed therein;

FIG. 3 is a partial perspective cross-sectional view of the female mold of FIG. 1 showing the formed mandrel as contracted by vacuum;

FIG. 4 is a partial perspective view of the formed mandrel in FIG. 3 after it has been withdrawn from the female mold and expanded back to its original size;

FIG. 5 is a partial perspective cross-sectional view of the mandrel of FIG. 4 having the material for forming the article to be manufactured wrapped about the mandrel;

FIG. 6 is a partial perspective view of the article in FIG. 5 with the mandrel separated and removed therefrom;

FIG. 7 is a perspective view of an irregularly shaped duct having a configuration that can be manufactured using the present method;

FIG. 8 is an enlarged cross-sectional view of an inflated tube used to form a chamber in the mandrel;

FIG. 9 is a partial perspective cross-sectional view of a female mold and mandrel having an inflated tube comprised of a plurality of tubes joined together in parallel relationship to form a honeycomb structure.

DESCRIPTION OF THE INVENTION

In brief, the present invention is a method for forming an elastic mandrel. By elastic is meant the ability to increase or decrease the exterior dimensions of the mandrel. An elastic mandrel is highly advantageous in manufacturing irregularly shaped hollow articles whether plastic ducts or concrete pipes which require the use of a male mold. The mandrel provides an interior or male mold for shaping the interior surfaces of the hollow object. Because the mandrel is elastic it is easily separated and removed from an article cast or fabricated about it. The mandrel is contracted to separate it from the fabricated article and expanded to restore it back to the original size. The elastic character enables one mandrel to be used repeatedly to manufacture articles of like design.

The mandrel is contracted and expanded using air or some other fluid to expand and contract a chamber within the mandrel. A compartment or chamber is formed within an elastic material while the material is being cured. The elastic mandrel is contracted by establishing a pressure difference between the chamber and the exterior of the mandrel. One way to accomplish this is to create a vacuum in the chamber. (Vacuum is intended to designate pressures below atmospheric pressure and is not intended to mean solely a perfect void.) Atmospheric pressure, i.e., the pressure external to the mandrel, compresses the mandrel causing it to contract by collapsing the chamber. Increasing the air pressure in the chamber expands the mandrel back to its original size. (Air is intended to designate those gasses commonly found in the earth's atmosphere.)

The method for forming the elastic mandrel includes the step of producing a female mold having a cavity of the size and shape of the interior of the duct. Collapsible tubes are placed in the cavity of the female mold and the cavity is filled with an uncured, liquid elastic material. The elastic material is then cured to form the mandrel. The female mold defines the exterior shape of the mandrel and the tubes define a chamber within the mandrel.

The female mold is made with materials capable of containing the elastic material and withstanding the curing step. The mold may be fabricated by any known method. The interior walls of the female mold are shaped in the configuration desired for a particular mandrel.

The tubes are used either to form the chamber within the elastic material or to comprise the chamber. In the former case, the tube is withdrawn after the curing step. The resultant cavity within the mandrel comprises the chamber. In the latter and preferable case, the tube and elastic material are bonded together with the hollow of the tube comprising the chamber. In either case, collapsing and inflating the chamber causes the mandrel to contract and expand. This is possible because the mandrel is an elastic material.

The presently preferred method of forming the mandrel is to employ the tubes so they themselves form the chambers in the mandrel. In this case, the tubes must be sufficiently flexible to enable them to collapse when the vacuum is created in them. The bond between the tubes and elastic material must be sufficient to substantially prevent air from seeping between them. In addition, it is preferable to make the tubes from an elastic material and to fiber reinforce the tubes to prevent overinflation, i.e., expansion of the mandrel beyond the dimensions and shape established by the female mold.

The reinforcing insures uniformity in the size of the mandrel, and therefore the finished product, during repeated deflations and inflations of the mandrel. The reinforcing material establishes one size for the mandrel for all pressures at or above the pressure required to fully inflate the tube. This means that it is not necessary to establish a precisely accurate pressure in the tube to obtain uniformity in size between the finished products. Accordingly, it is preferable to inflate a tube to its fully inflated size prior to bonding the tube to the elastic material.

Another reason for reinforcing the flexible tubes with a cloth fiber or filament of some other composition is to increase the stiffness and rigidity of the inflated mandrel. As air pressure is increased in the tube beyond that necessary for complete expansion of the mandrel, tension is increased in the fibers both around the circumference and along the axis of the tubes. Therefore, the inflated, reinforced tube forms a structural member for the mandrel. The rigidity of the mandrel can be varied by varying the pressure in the tube. The upper limit on the rigidity attainable is dependent on the tensile strength of the reinforcing material.

The cross section of an inflated tube is shown in FIG. 8. Tube 1 includes a rubber material 2 and cloth fiber material 3. The cloth fiber 3 may be coated with a material to improve its bonding or adhesion to the elastic material. The circular cross-sectional shape for the tube is preferred because the force exerted by a fluid in the tube is equal in all directions. Therefore, if the pressure in the tube exceeds the external pressure on the tube, and the tube is otherwise unrestrained, the tube will tend to assume a circular cross section.

The diameter of the tube may vary along its axis to facilitate positioning it within various contours of the female mold. In addition, the tubes may be branched for extending into a Y-shaped contour for example. The tubes may also be joined together by branches forming a labyrinth type chamber within a mandrel.

FIG. 9 illustrates a mandrel 4 having a honeycomb tube or compartment 5 therein. The honeycomb tube structure is formed by connecting a plurality of tubes in parallel. The individual tubes used to form the honeycomb structure 5 are not completely circular because they are restrained at the points where they are connected together. The individual tubes are shaped in the form of an arc where unrestrained again because the force exerted by the fluid is equal in all directions. The honeycomb mandrel 4 is particularly suited for fabricating long sections of ducts having a generally rectangular cross section.

The elastic material used to make the mandrel comprises an elastomer having liquid and solid states. The elastic property is required while in the solid state. Curing the elastomer, i.e., changing it from a liquid to a solid state, is accomplished by employing a catalyst or by some other known means. The elastic material must have sufficient mechanical strength to permit the fabrication of the duct around it. Examples of materials that may be used are polyvinyl chloride resin, silicone rubber and rubber available under the trade name "Thiokol".

FIG. 7 illustrates a portion of an irregularly shaped, elongated duct. The configuration shown is intended to be representative of the many various shapes required of ducts employed in aircraft and the like. The duct may be produced from fiber glass and resin or other plastic materials.

Initially, a female mold conforming to the interior shape of the duct shown in FIG. 7 is constructed using known techniques. The female mold 6 of which a portion is illustrated in FIG. 1, is coated with a parting agent to ease its separation from the formed mandrel and thereafter the female mold is filled with the mandrel-forming materials. A plurality of tubes 1, like those of FIG. 8, are inflated and positioned in the cavity of the female mold. A liquid elastic material 7 is poured into the mold so that it flows around the tubes 1 and completely fills the mold. Upon curing of the elastic material, the mandrel is confined within the mold 6 as shown in FIG. 2.

FIG. 3 illustrates the separation of the elastic material from mold 6 incident to the creation of a partial vacuum in the tubes 1. The reference numeral 8 is hereinafter used to designate the formed elastic mandrel. The vacuum in the plurality of tubes is generally the same and need be sufficient to contract the elastic material. The tubes are staggered to minimize the distortion of the mandrel exterior shape when contracted. The extent to which the mandrel 8 is contracted depends upon the diameter and number of tubes, the magnitude of the vacuum pressures and the elasticity of the material 7. These and other factors are chosen to give a sufficient contraction to effect a separation between the mandrel 8 and the mold 6. A separation is shown in FIG. 3 with the dimensions 9 designating the spacing between the mandrel and mold. The tubes are shown partially collapsed in FIG. 3. With the mandrel contracted, it may then be readily removed from the female mold.

After the mandrel is removed from the mold, the release of the vacuum and inflation of the tubes of the original pressure results in the expansion of tubes and mandrel 8 to the original size and shape. The separated, inflated mandrel is shown in FIG. 4.

The formed mandrel 8 is coated with a parting agent in preparation for fabrication of a duct. By way of example, sheets of pliable fiber glass 10 are wrapped about mandrel 8 as shown in FIG. 5. The fiber glass is impregnated with a suitable resin and the resin impregnated fiber glass is hardened or cured by known methods. The cured material 10 is the duct 11 which has an inner configuration corresponding generally to the exterior shape of mandrel 8. The tubes 1 are deflated and a vacuum applied thereto to contract the mandrel. The mandrel is then readily removed from the duct. FIG. 6 illustrates a portion of duct 11 after removal of mandrel 8. Mandrel 8 is repeatedly used to manufacture additional ducts merely by expanding it back to its original shape and repeating the steps required to fabricate the duct on the mandrel.

It is believed that the invention will have been clearly understood from the foregoing detailed description of my now-preferred illustrated embodiment. Changes in the details of construction may be resorted to without departing from the spirit of the invention and it is accordingly my intention that no limitations be implied and that the hereto annexed claims be given the broadest interpretation to which the employed language fairly admits.

The embodiments of the invention in which an exclusive property or privilege is claimed are defined as follows:

1. A method of forming elongated, irregularly shaped hollow ducts having at least one open end without requiring the use of a female mold about the exterior of the duct during the formation thereof which includes forming an elastic reusable mandrel having a shaped outer surface formed by a mass of elastic material surrounding an inflatable inner chamber means of limited, expanded cross section by filling the cavity of a female mold with at least one inflatable tube having a fixed limited cross section when inflated and an uncured elastic material and inflating the tube to the limit of said fixed cross section before the elastic cures, curing said elastic material to form said shaped outer surface for said mandrel, said female mold defining the exterior shape of said mandrel and said tube defining the inflatable inner chamber means, releasing the pressure in said tube to decrease the size of said tube and cured elastic mass integral therewith, removing the formed mandrel and tube from the female mold, reinflating said tube to the limit of said fixed cross section, fabricating said duct about said mandrel after said tube is reinflated and, after said duct becomes rigid, releasing the pressure in said tube and removing the mandrel from said duct.

2. The method of claim 1 wherein said chamber is formed by a plurality of tubes connected together to form a honeycomb structure of fixed limited cross section when inflated.

3. The method of claim 2 including the step of separating said elastic mandrel from said female mold by creating a vacuum in said internal chamber to contract said mandrel.

* * * * *